(12) United States Patent
Grenie et al.

(10) Patent No.: US 10,001,576 B2
(45) Date of Patent: Jun. 19, 2018

(54) THREE-DIMENSIONAL SEISMIC ACQUISITION SYSTEM AND METHOD WITH DYNAMIC RESOLUTION

(71) Applicant: CGG SERVICES SA, Massy (FR)

(72) Inventors: Damien Grenie, Limours (FR); Risto Siliqi, Paris (FR)

(73) Assignee: CGG SERVICES SAS, Massy (FR)

( * ) Notice: Subject to any disclaimer, the term of this patent is extended or adjusted under 35 U.S.C. 154(b) by 90 days.

(21) Appl. No.: 15/133,575

(22) Filed: Apr. 20, 2016

(65) Prior Publication Data

US 2016/0313466 A1    Oct. 27, 2016

Related U.S. Application Data

(60) Provisional application No. 62/152,973, filed on Apr. 27, 2015.

(51) Int. Cl.
*G01V 1/38* (2006.01)

(52) U.S. Cl.
CPC .................. *G01V 1/3808* (2013.01)

(58) Field of Classification Search
CPC .................................................. G01V 1/3808
USPC .......................................................... 367/15
See application file for complete search history.

(56) References Cited

U.S. PATENT DOCUMENTS

| 3,806,863 | A | 4/1974 | Tilley et al. |
| 4,918,668 | A | 4/1990 | Sallas |
| 2007/0159921 | A1 | 7/2007 | Regone et al. |
| 2012/0069702 | A1 | 3/2012 | Muyzert et al. |
| 2013/0188448 | A1 | 7/2013 | Siliqui et al. |
| 2014/0369162 | A1 | 12/2014 | Teyssandier et al. |
| 2015/0160360 | A1 | 6/2015 | Grenie |

(Continued)

FOREIGN PATENT DOCUMENTS

| WO | 2009/143579 A1 | 12/2009 |
| WO | 2015/089064 A1 | 6/2015 |
| WO | 2015/175766 A1 | 11/2015 |

OTHER PUBLICATIONS

Extended European Search Report in corresponding European Application No. EP 16 30 5476 dated Sep. 9, 2016. (Reference D1, US 2013/188448 A1, was submitted with an Information Disclosure Statement on Apr. 20, 2016.)

*Primary Examiner* — Daniel L Murphy
(74) *Attorney, Agent, or Firm* — Patent Portfolio Builders PLLC

(57) ABSTRACT

System and method for calculating a pre-plot for a marine seismic acquisition system. The method includes receiving as input a first number of streamer vessels and a second number of source vessels; receiving a geometry of an area to be surveyed; receiving a set of naturally different regions and/or humanly set targets for the area to be surveyed; calculating a first sailing path for a streamer vessel of the first number of streamer vessels; calculating a second sailing path for a source vessel of the second number of source vessels, based on the set of naturally different regions and/or humanly set targets; and entering the pre-plot into a navigation system of the streamer vessel and the source vessel so that the streamer and source vessels dynamically change an offset distance between them, while sailing during a seismic survey, based on the naturally different regions and/or humanly set targets.

20 Claims, 16 Drawing Sheets

(56) References Cited

U.S. PATENT DOCUMENTS

2016/0178776 A1\* 6/2016 Bernitsas ............. G01V 1/3808
367/20

\* cited by examiner

FIG. 6

| | |
|---|---|
| *Unconsolidated materials* | km/sec |
| Sand (dry) | 0.2-1.0 |
| Sand (water saturated) | 1.5-2.0 |
| Clay | 1.0-2.5 |
| Glacial till (water saturated) | 1.5-2.5 |
| Permafrost | 3.5-4.0 |
| | |
| *Sedimentary Rocks* | |
| Sandstones | 2.0-6.0 |
|   *Tertiary sandstone* | 2.0-2.5 |
|   *Pennant sandsonte (Carboniferous)* | 4.0-4.5 |
|   *Cambrian quartzite* | 5.5-6.0 |
| | |
| Limestones | 2.0-6.0 |
|   Cretaccous chalk | 2.0-2.5 |
|   Jurassic oolites and bioclastic limestones | 3.0-4.0 |
|   Carboniferous limestone | 5.0-5.5 |
| | |
| Dolomites | 2.5-6.5 |
| Salt | 4.5-5.0 |
| Anhydritc | 4.5-6.5 |
| Gypsum | 2.0-3.5 |
| | |
| *Igneous/Metamorphic rocks* | |
| Granite | 5.5-6.0 |
| Gabbro | 6.5-7.0 |
| Ultramafic rocks | 7.5-8.5 |
| Serpentitine | 5.5-6.5 |
| | |
| *Pore fluids* | |
| Air | 0.3 |
| Water | 1.4-1.5 |
| Ice | 3.4 |
| Petroleum | 1.3-1.4 |
| | |
| *Other materials* | |
| Steel | 6.1 |
| Iron | 5.8 |
| Aluminium | 6.6 |
| Concrete | 3.6 |

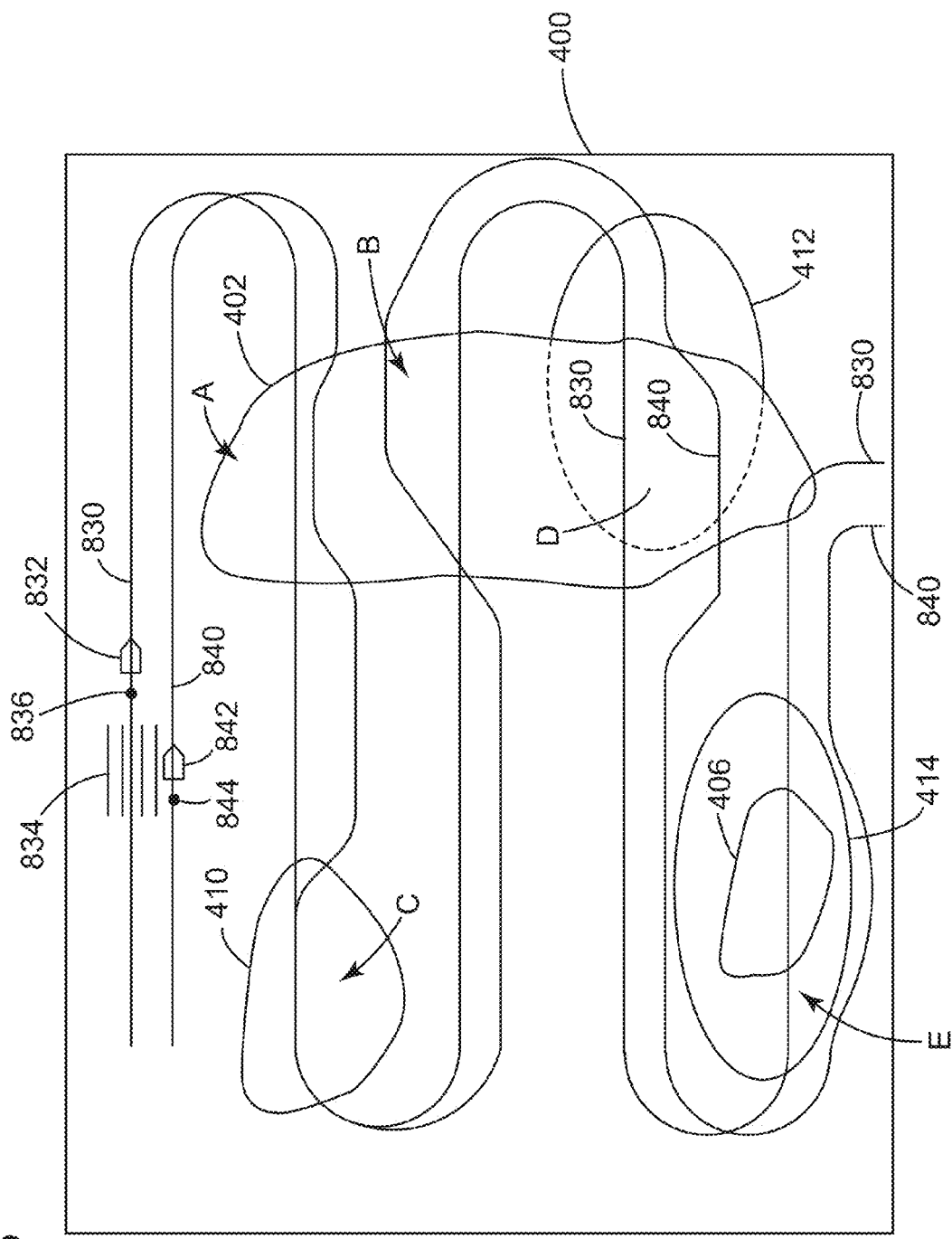

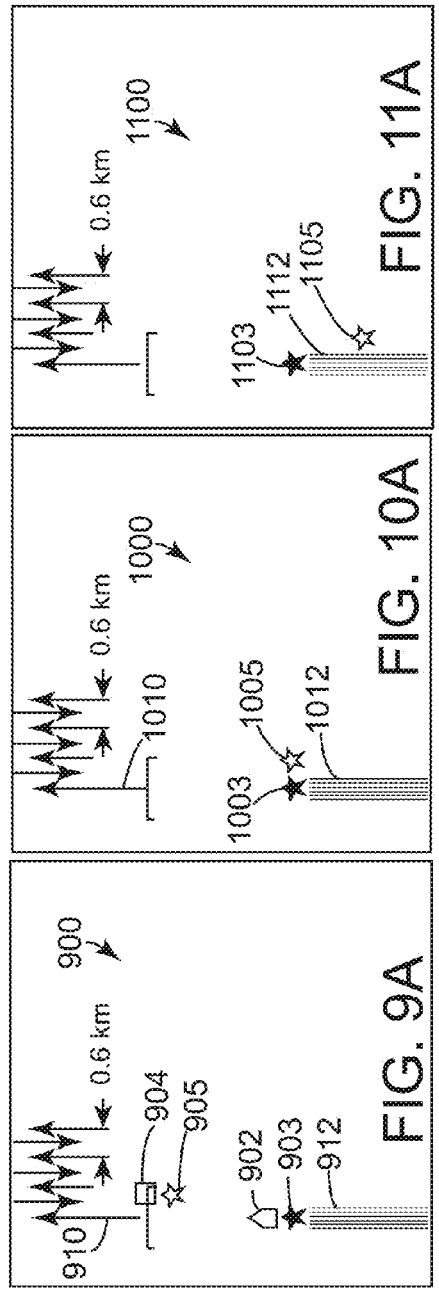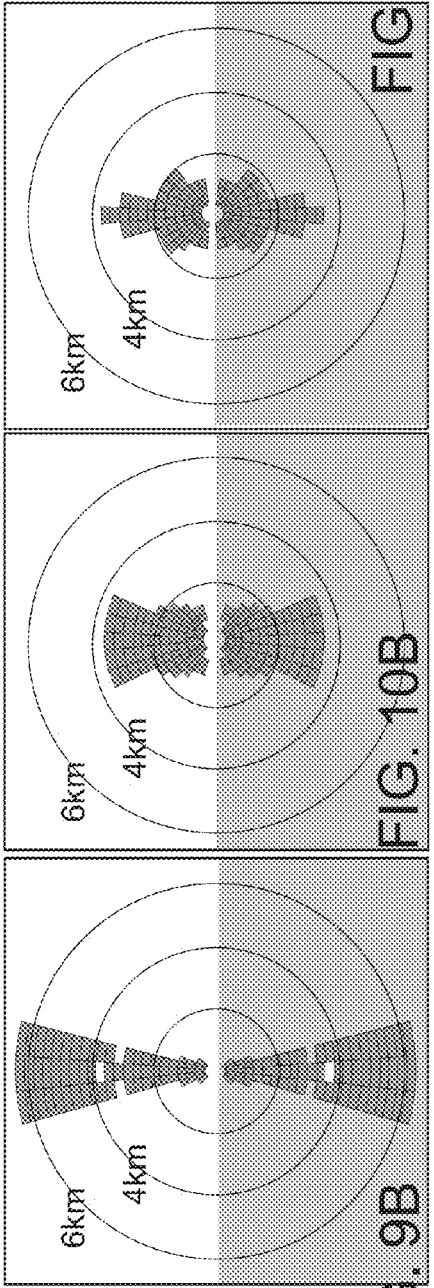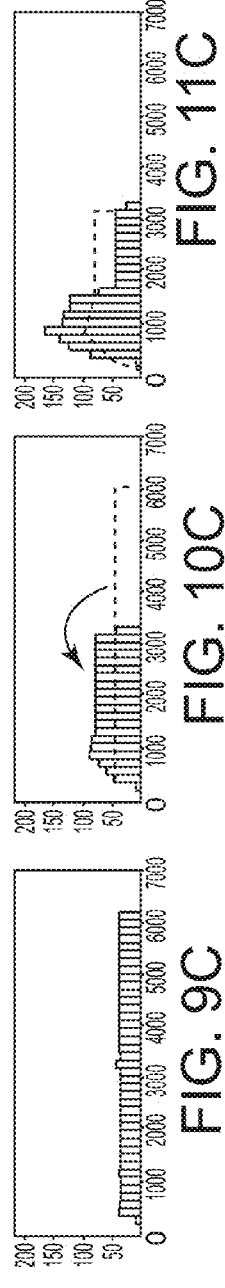

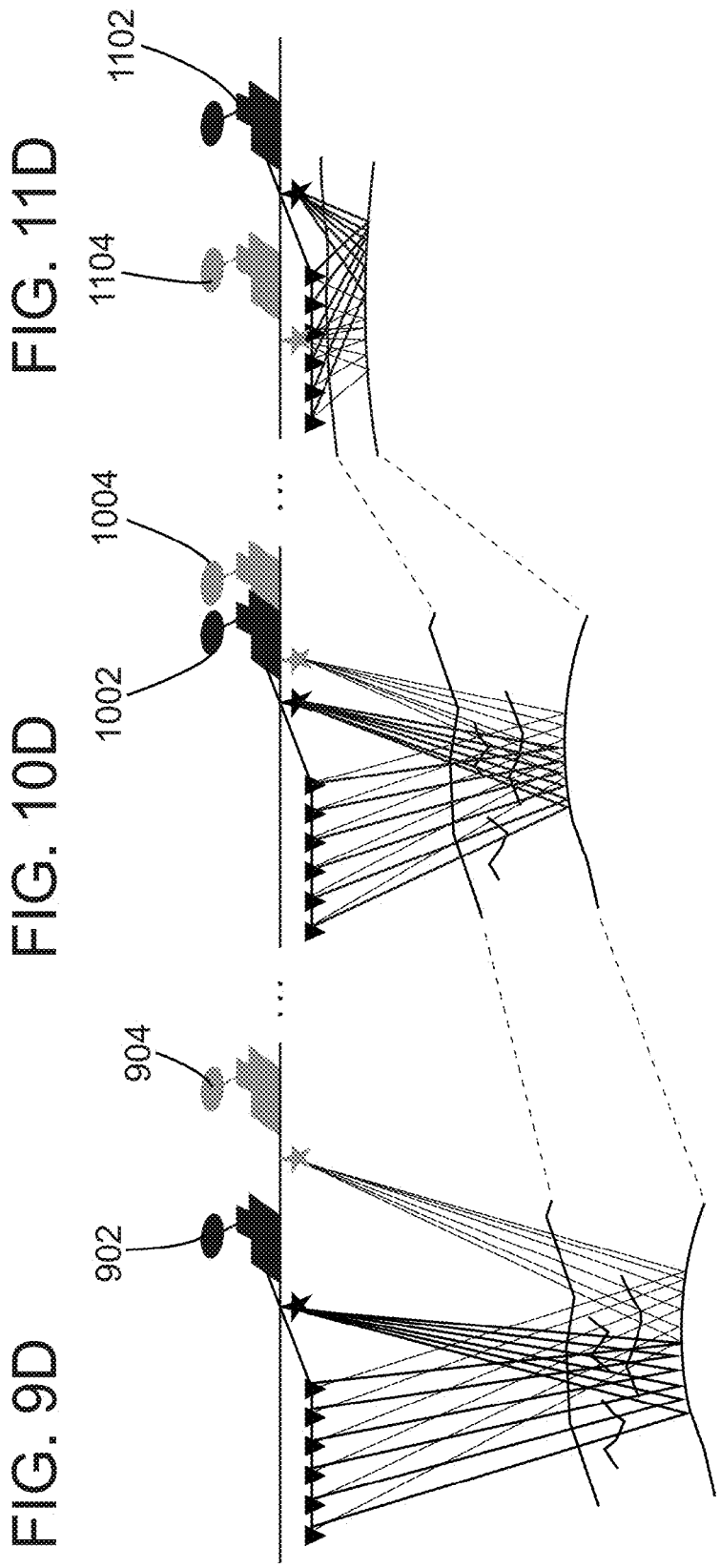

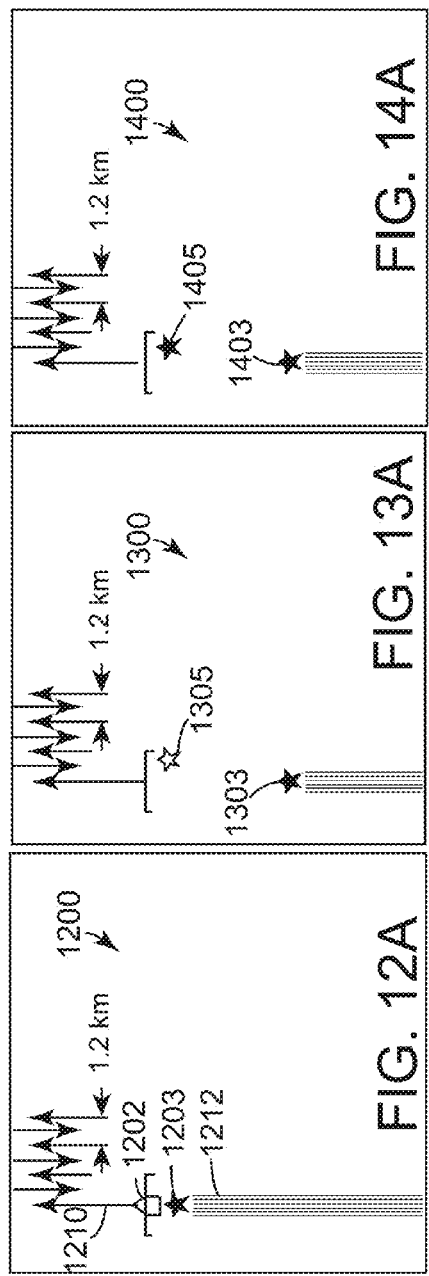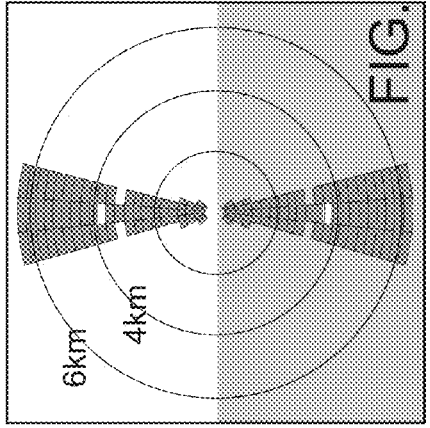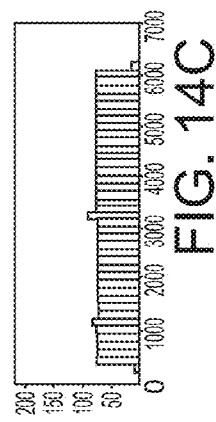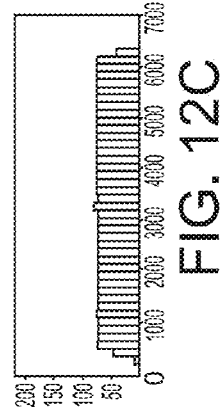

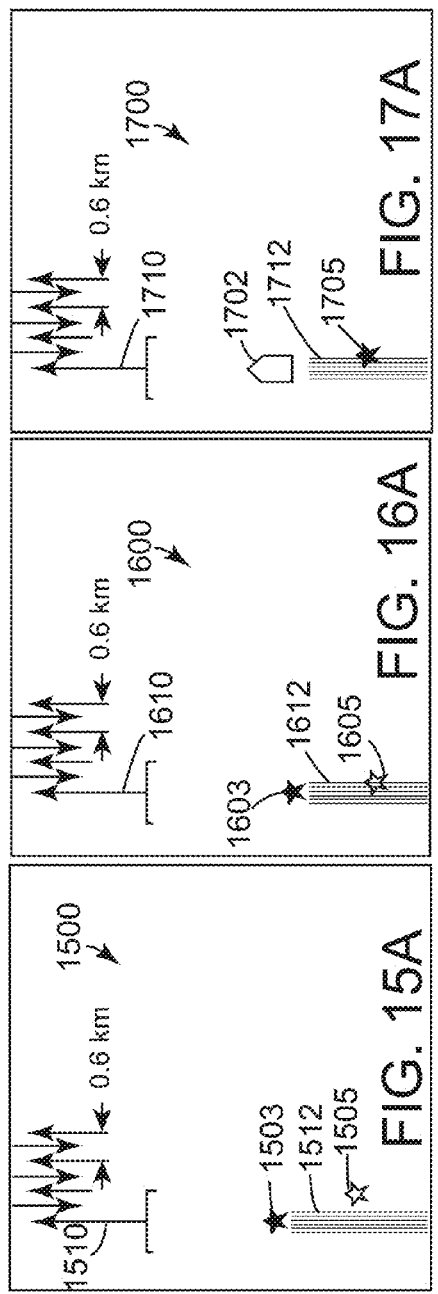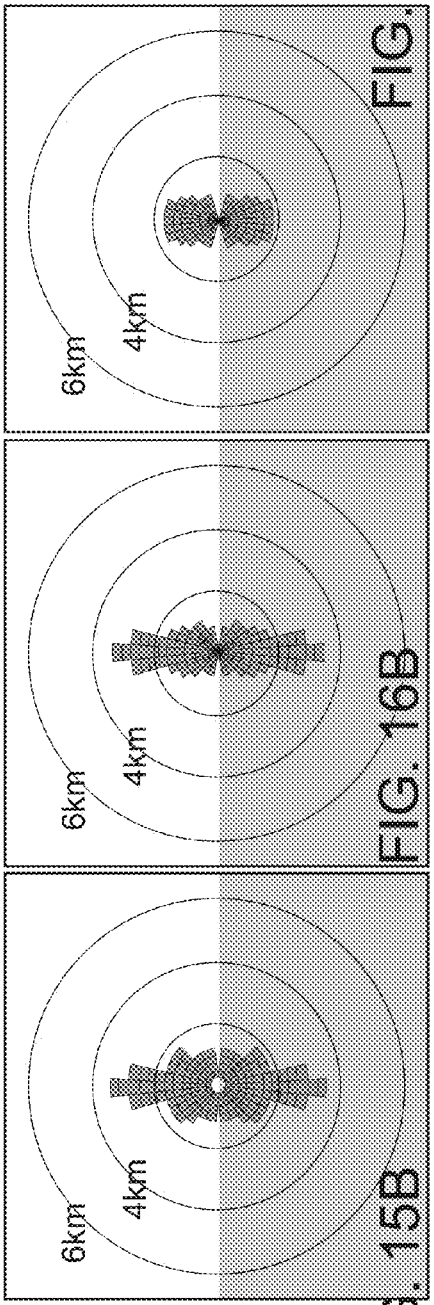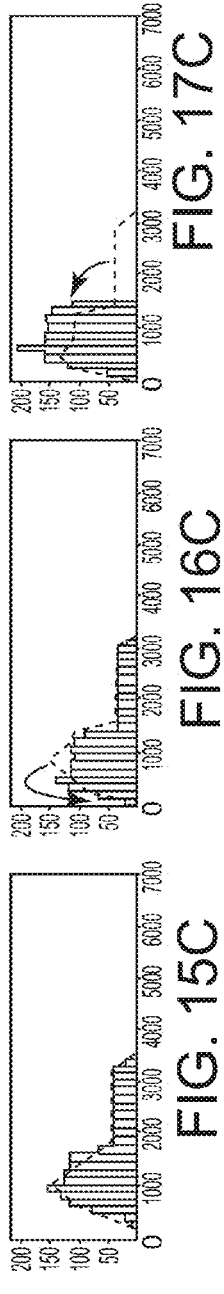

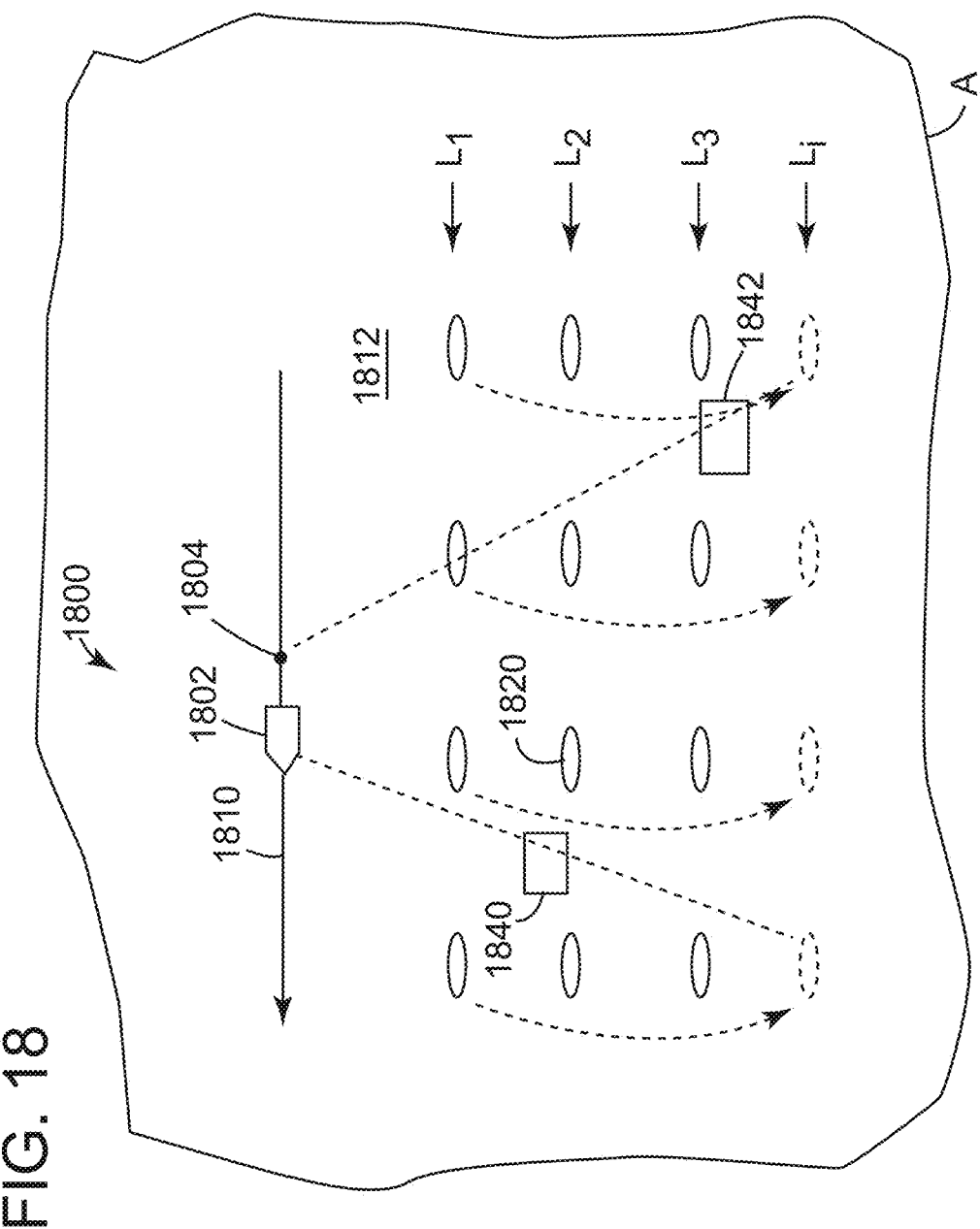

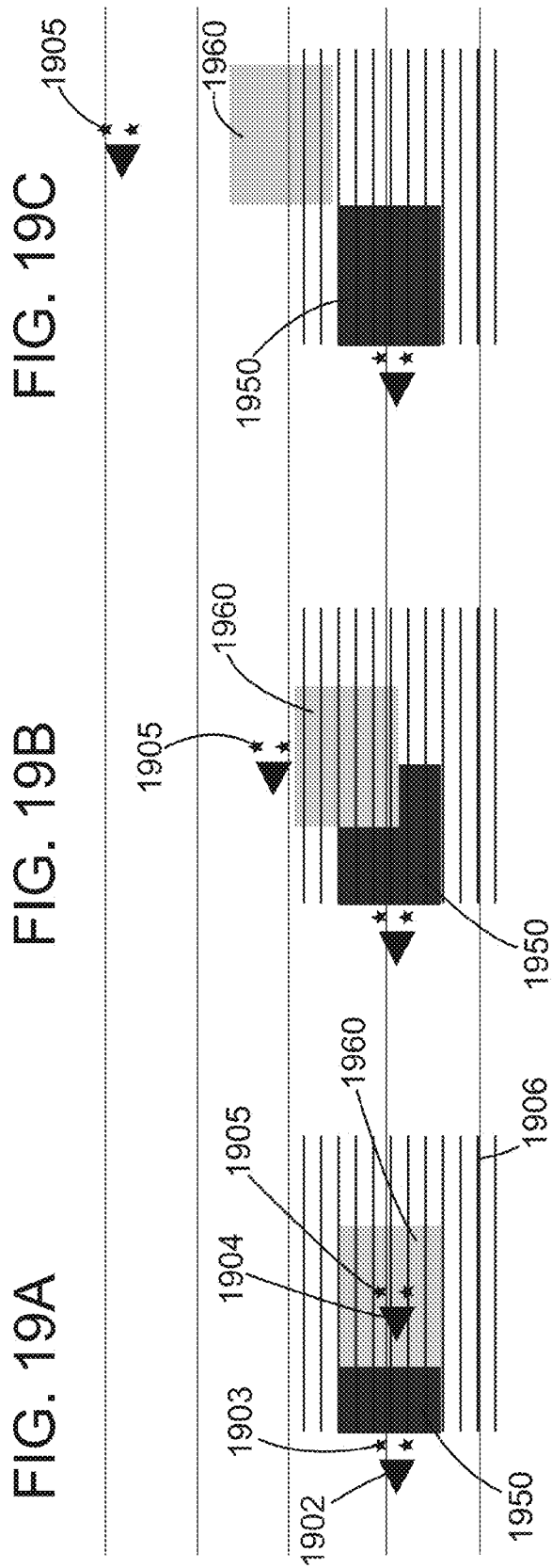

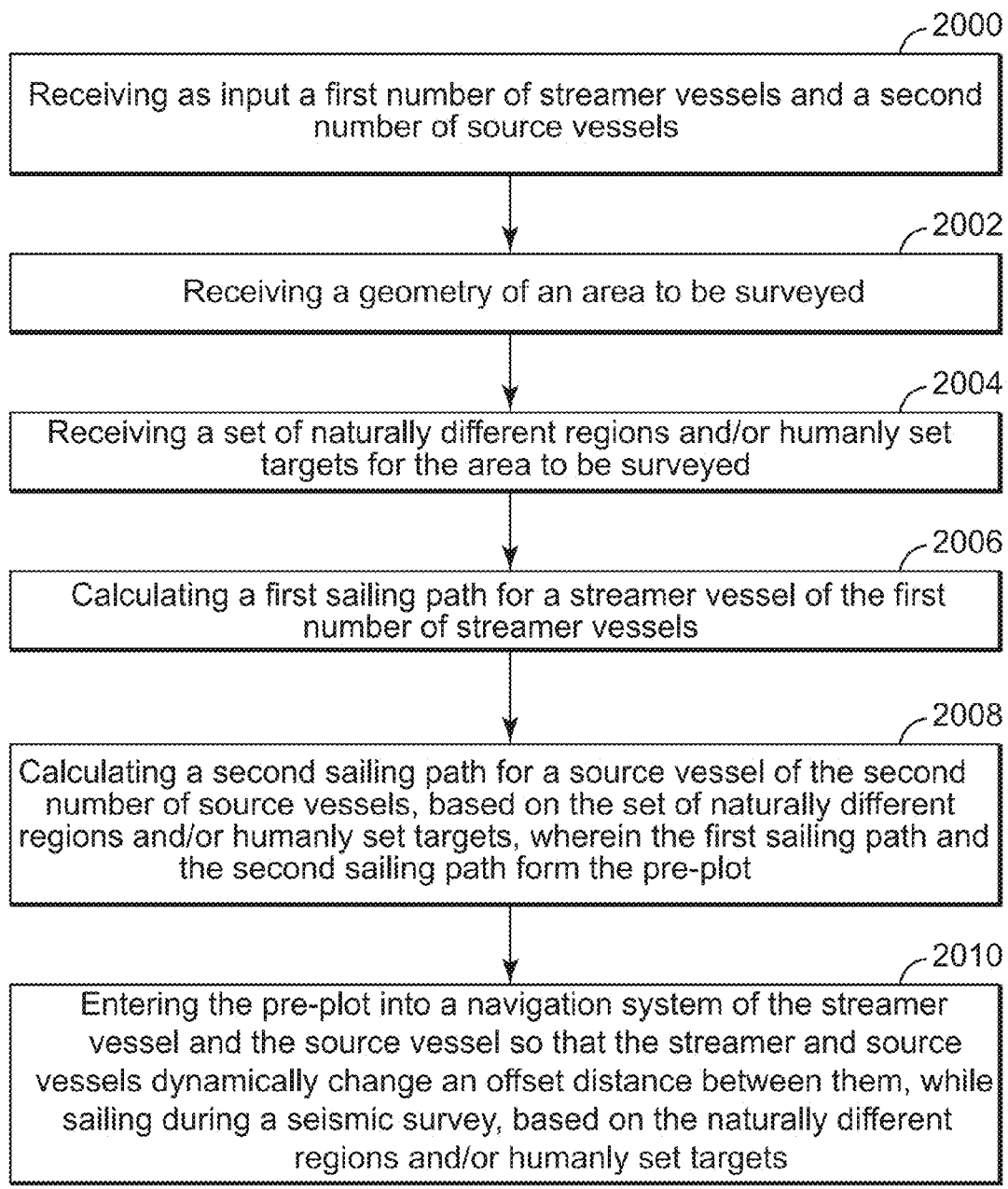

THREE-DIMENSIONAL SEISMIC ACQUISITION SYSTEM AND METHOD WITH DYNAMIC RESOLUTION

CROSS REFERENCE TO RELATED APPLICATIONS

The present application claims the benefit of priority under 35 U.S.C. § 119(e) to U.S. Provisional Application No. 62/152,973, filed on Apr. 27, 2015, the entire content of which is hereby incorporated by reference into the present application.

TECHNICAL FIELD

Embodiments of the subject matter disclosed herein generally relate to methods and systems for marine seismic data acquisition and, more particularly, to mechanisms and techniques for dynamic adjustment of azimuth and/or offset distribution during acquisition of marine seismic data.

BACKGROUND

Marine seismic data acquisition and processing techniques are used to generate a profile (image) of a geophysical structure (subsurface) under the seafloor. This profile does not necessarily provide an accurate location for oil and gas reservoirs, but it may suggest, to those trained in the field, the presence or absence of oil and/or gas reservoirs. The step of generating an image of the subsurface is indispensable for modern well drilling and/or well management. Thus, providing a better image of the subsurface is an ongoing process.

For a seismic gathering process, as shown in FIG. 1, a marine seismic data acquisition system 100 includes a survey vessel 102 towing a plurality of streamers 104 (one shown) that may extend over kilometers behind the vessel. One or more source arrays 106 may also be towed by the survey vessel 102 or another survey vessel (not shown) for generating seismic waves 108. Conventionally, the source arrays 106 are placed in front of the streamers 104, considering a traveling direction of the survey vessel 102. The seismic waves 108 generated by the source arrays 106 propagate downward and penetrate the seafloor 110, eventually being reflected by a reflecting structure 112, 114, 116, 118 at an interface between different layers of the subsurface, back to the surface 119. The reflected seismic waves 120 propagate upward and are detected by detectors 122 provided on or inside the streamers 104. This process is generally referred to as "shooting" a particular seafloor 110 area.

One of the shortcomings of existing technology relates to the poor azimuth/offset distribution of the data collection points, i.e., detectors 122, positioned along streamers of equal length, and the number of streamers 104 attached to the survey vessel 102. Generally, a single survey vessel 102 tows approximately ten to sixteen streamers 104, of uniform length, with detectors 122 equally spaced along the length of each streamer. In this configuration, the azimuth of the collection points is narrow. The azimuth is defined as the angle made between a line that passes through the source and a recording receiver and the navigation path when viewed from above the source and the recording receiver. Narrow azimuth distribution (typical for a single vessel seismic survey) leads to problems associated with multiple (reflective) removals at locations on the streamers in close proximity to the source arrays 106. It should be noted that a survey vessel is limited in the number of streamers 104 it can tow.

Another shortcoming associated with existing acquisition methods relates to the collected data in relation to its intended use, i.e., different streamer collection configurations lend themselves to different uses of the data, such as multiple removal, imaging and model building. Narrow azimuth distribution streamer configurations are not focused on a specific use of the collected data, resulting in less than optimal seismic image results.

An acquisition method having better azimuth and offset distribution than the system shown in FIG. 1 is illustrated in FIG. 2 (which corresponds to FIG. 11 of U.S. patent application Ser. No. 13/748,062, the entire content of which is incorporated by reference herein), in which a seismic survey system 200 includes five vessels 202 to 210. Vessels 202 and 204 are configured to tow corresponding streamer spreads 212 and 214, respectively, and corresponding source arrays 202a and 204a, while each of vessels 206, 208 and 210 are configured to tow only a corresponding source array 206a, 208a and 210a, respectively. This system has the vessels 202 to 210 distributed along a straight line 220 so that each vessel has a different inline direction (traveling direction) at a given instant.

The azimuth distribution associated with seismic acquisition system 100 is shown in FIG. 3A while the azimuth distribution associated with the seismic acquisition system 200 is shown in FIG. 3B. FIG. 3A plots the azimuth (grey scale) versus the source-receiver offset while FIG. 3B plots the azimuth (grey scale) for the Y offsets between the source and the receivers versus the X offsets between the source and the receivers.

Although an azimuth distribution improvement is noted in FIG. 3B comparative to that of FIG. 3A, both configurations are limited in the sense that the azimuth distribution is fixed, i.e., does not change as the seismic survey progresses and encounters various targets.

Accordingly, it would be desirable to provide systems and methods that can dynamically adjust the azimuth distribution to address the right seismic target of interest.

SUMMARY

According to an embodiment, there is a method for calculating a pre-plot for a marine seismic acquisition system. The method includes a step of receiving as input a first number of streamer vessels and a second number of source vessels, a step of receiving a geometry of an area to be surveyed, a step of receiving a set of naturally different regions and/or humanly set targets for the area to be surveyed, a step of calculating a first sailing path for a streamer vessel of the first number of streamer vessels, a step of calculating a second sailing path for a source vessel of the second number of source vessels, based on the set of naturally different regions and/or humanly set targets, wherein the first sailing path and the second sailing path form the pre-plot, and a step of entering the pre-plot into a navigation system of the streamer vessel and the source vessel so that the streamer and source vessels dynamically change an offset distance between them, while sailing during a seismic survey, based on the naturally different regions and/or humanly set targets.

According to another embodiment, there is a marine acquisition system that includes a streamer vessel that tows a streamer spread and a first source, a source vessel that tows a second source, coordinates of a streamer sail line stored at the streamer vessel, and coordinates of a source sail line stored at the source vessel. The coordinates of the source sail line are calculated based on a set of naturally different regions and/or humanly set targets that characterize a region to be surveyed.

According to still another embodiment, there is a method for acquiring seismic data with varying illumination and/or resolution. The method includes a step of towing with a streamer vessel a streamer spread and a first source; a step of towing with a source vessel a second source, a step of navigating with the streamer vessel along a streamer sail line, and a step of navigating with the source vessel along a source sail line. The source sail line is calculated based on a set of naturally different regions and/or humanly set targets that characterize a region to be surveyed.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 illustrates possible naturally different regions encountered in seismic exploration;

FIG. 8 illustrates a calculated pre-plot for a given area to be surveyed;

FIGS. 9A-11D illustrate three different configurations of a streamer vessel and a source vessel and associated azimuth distribution and fold when the inline positions of the vessels are changed;

FIGS. 12A-12C illustrate a traditional narrow azimuth seismic acquisition configuration, its azimuth distribution and associated fold;

FIGS. 13A-14C illustrate two configurations with shorter streamer spread and sequential and simultaneous shooting of the sources;

FIGS. 15A-17C illustrate three different configurations of a streamer vessel and a source vessel and associated azimuth distribution and fold when the cross-line positions of the vessels are changed;

FIG. 18 illustrates a configuration that uses underwater nodes instead of streamers for recording the seismic data;

FIGS. 19A-19C illustrate the concepts of illumination and resolution;

FIG. 20 is a flowchart of a method for designing a pre-plot that smoothly transition the vessels from one configuration to another configuration.

DETAILED DESCRIPTION

Figure 1:
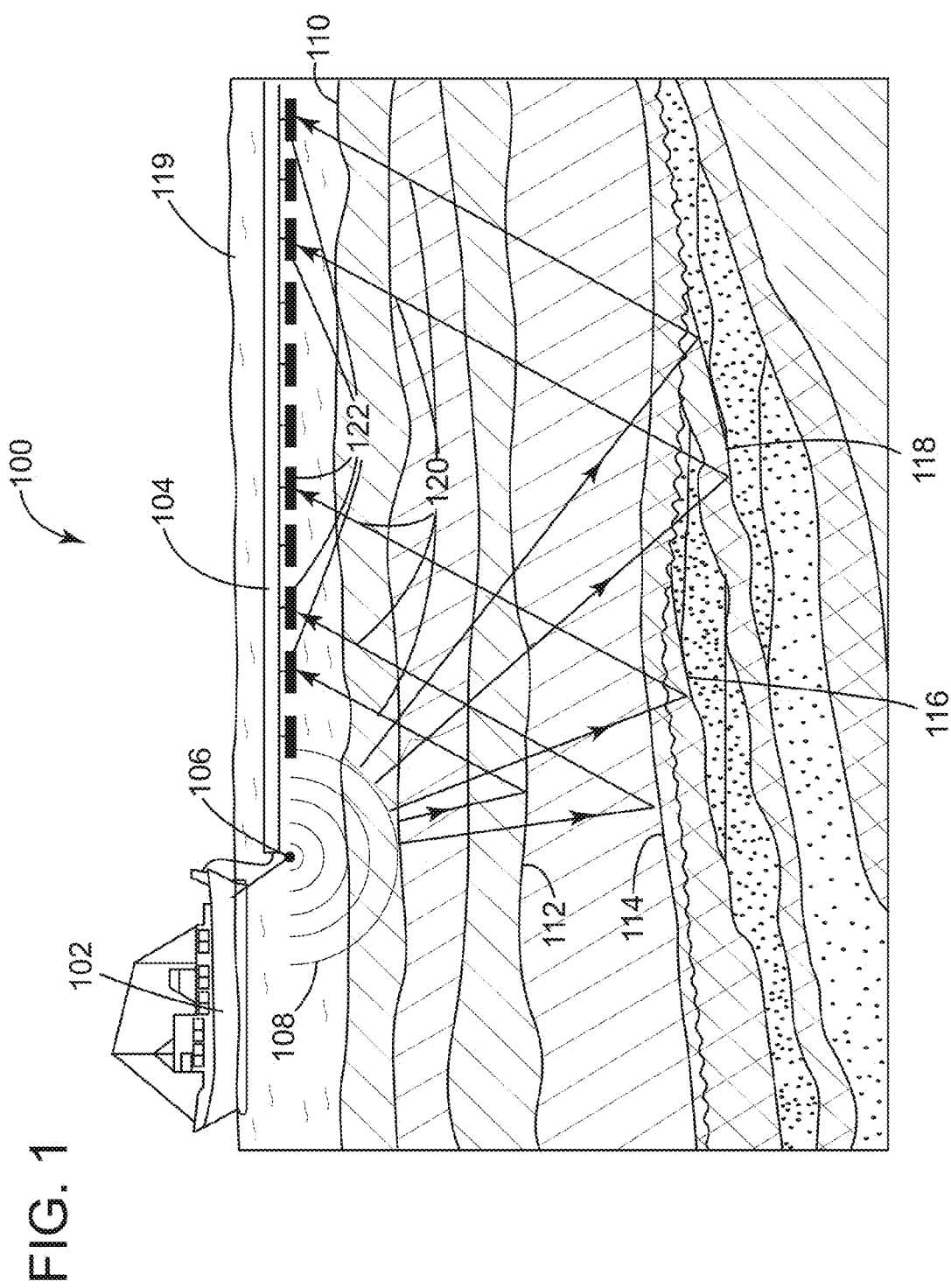
FIG. 1 is a schematic illustration of a marine seismic data acquisition system.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of a seismic acquisition system that includes one streamer vessels and one source vessel. However, the embodiments to be discussed next are not limited to this configuration, but may be extended to other arrangements that include more or fewer streamer vessels and/or source vessels. Further, the disclosed embodiments may be applied to a seismic acquisition system that uses autonomous underwater vehicles (AUV) instead of streamers, or a flotilla of seismic source components instead of towed airgun source arrays. Furthermore, the figures show a particular order of the streamer and source vessels along a cross-line direction. This order is exemplary and not intended to limit the embodiments.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, the inventors of this application have realized that for many seismic acquisition surveys, the area to be surveyed is not uniform, i.e., the underground volume below the area is not homogeneous, but rather it has varying properties. For example, the volume under area 400 in FIG. 4 may include a salt dome 402, a shallow formation 404, a gas cloud 406, etc. Each of these formations needs different illuminations and/or resolutions for being accurately imagined, which is not the case with the current seismic acquisition systems. Most of the current seismic acquisition systems record the seismic data with the same illumination and resolution throughout the survey area. In addition, the inventors have also recognized that for some seismic acquisition surveys, there are various targets to be imagined, i.e., a first target 410 that corresponds to a shallow formation and a second target 420 that corresponds to a deep formation.

In other words, for a given area 400 that corresponds to a single seismic survey, the operator of the survey is faced not only with naturally different regions 402, 404 and 406 (i.e., underground structures that are naturally occurring), but also with humanly set different targets 410 and 412 (i.e., targets set by a person, which may or may not include a naturally occurring structure). The number of these regions and/or targets can vary from a few to hundreds for a single seismic survey. Those skilled in the art would understand that for a given seismic survey, it is possible to deal only with the naturally different regions, or with only the humanly set different targets, or with both of these categories. In addition, those skilled in the art would understand that the examples shown in FIG. 4 are just example, and they are in no way exhaustive or indicative of all possible regions and targets that are present during an actual seismic survey.

The naturally different regions are known by the operator of the survey prior to starting the survey based on existing models of the earth. The humanly set different targets are determined by the oil and gas exploring companies and are communicated to the operator of the survey.

Figure 2:
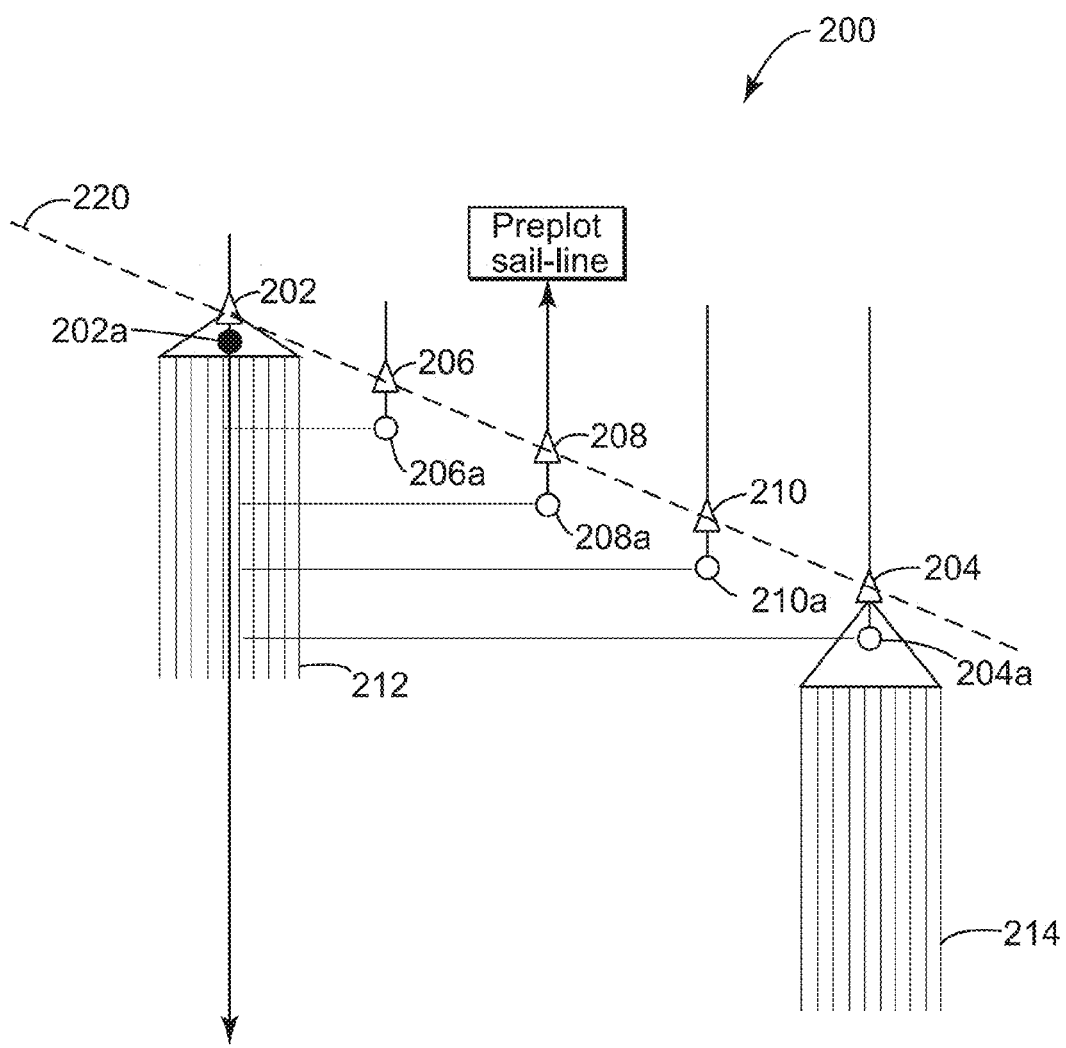
FIG. 2 is a schematic illustration of a multi-vessel marine seismic data acquisition system.
Figure 3B:
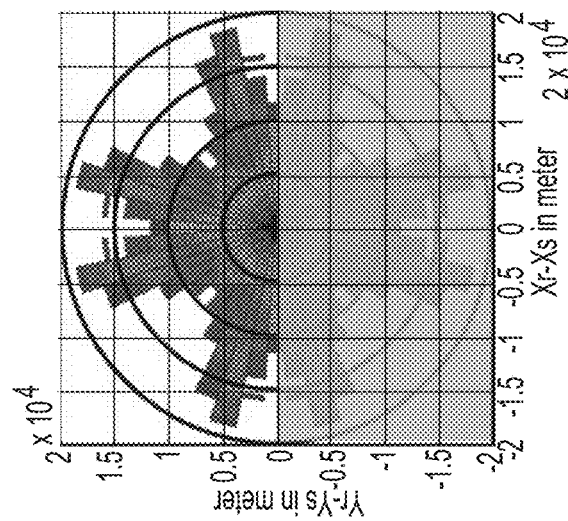
FIG. 3B illustrates the azimuth distribution associated with the system of FIG. 2.
Figure 3A:
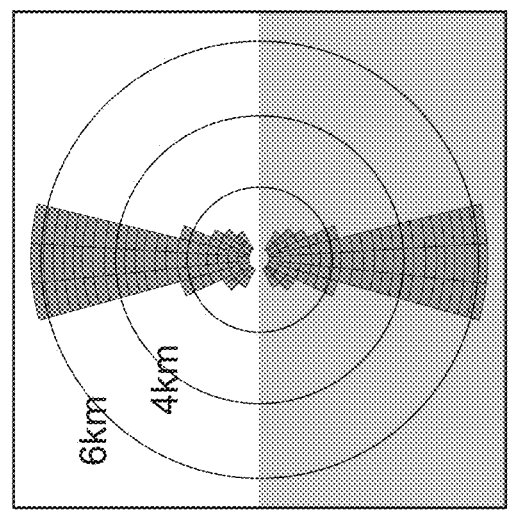
FIG. 3A illustrates the azimuth distribution associated with the system of FIG. 1
Figure 4:
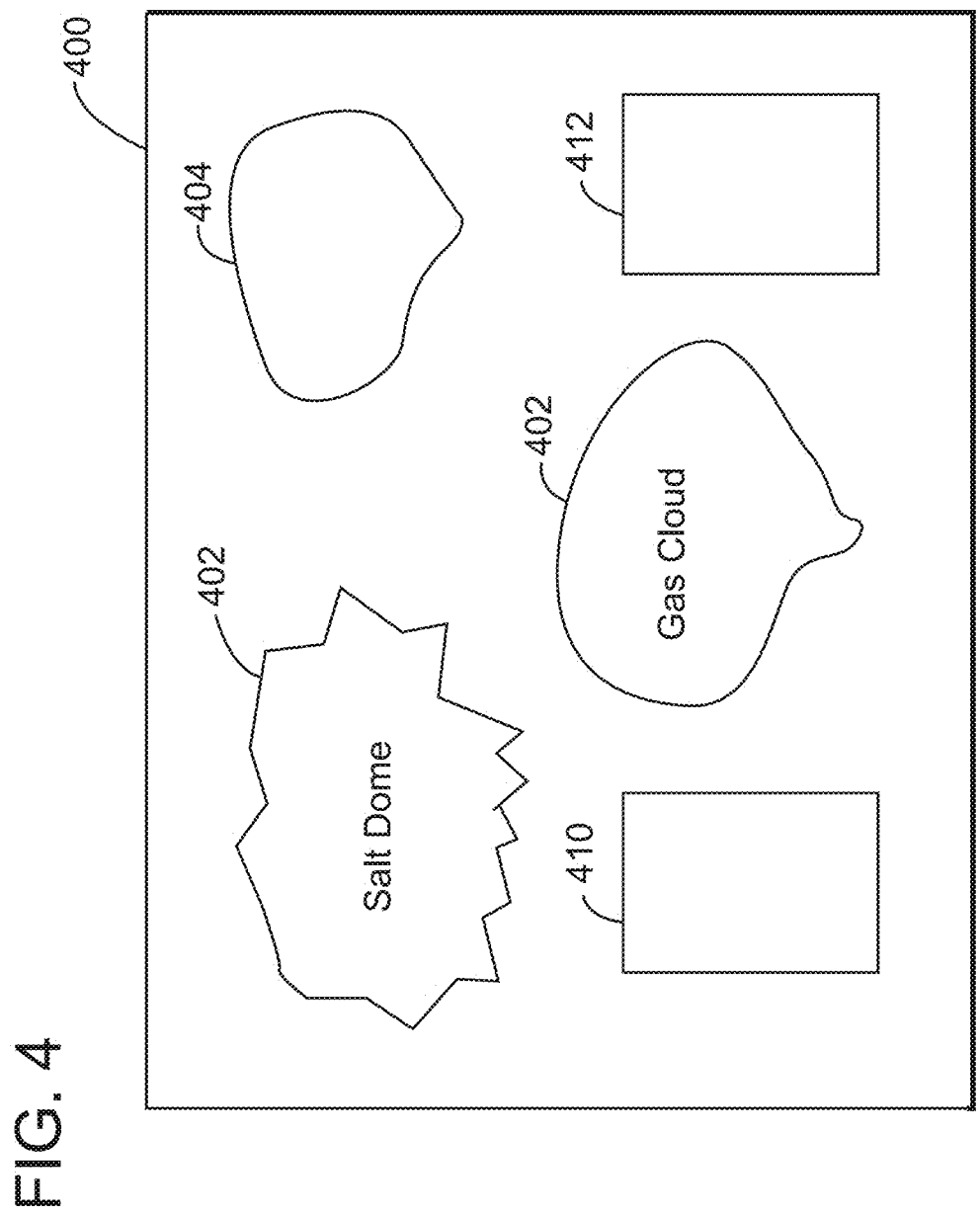
FIG. 4 is a bird view and FIG. 5 is a cross-view of naturally different regions and humanly set targets distributed over an area to be surveyed.

With the current technologies illustrated in FIGS. 1 and 2, it is not possible to differentially treat the regions and targets noted in FIG. 4. Therefore, after acquiring the seismic data with a traditional seismic acquisition system, some of these regions and/or targets are well imagined while the others are not. This is so because until now, the illumination and/or resolution of a seismic survey was fixed, i.e., constant during the seismic survey.

Figure 5:
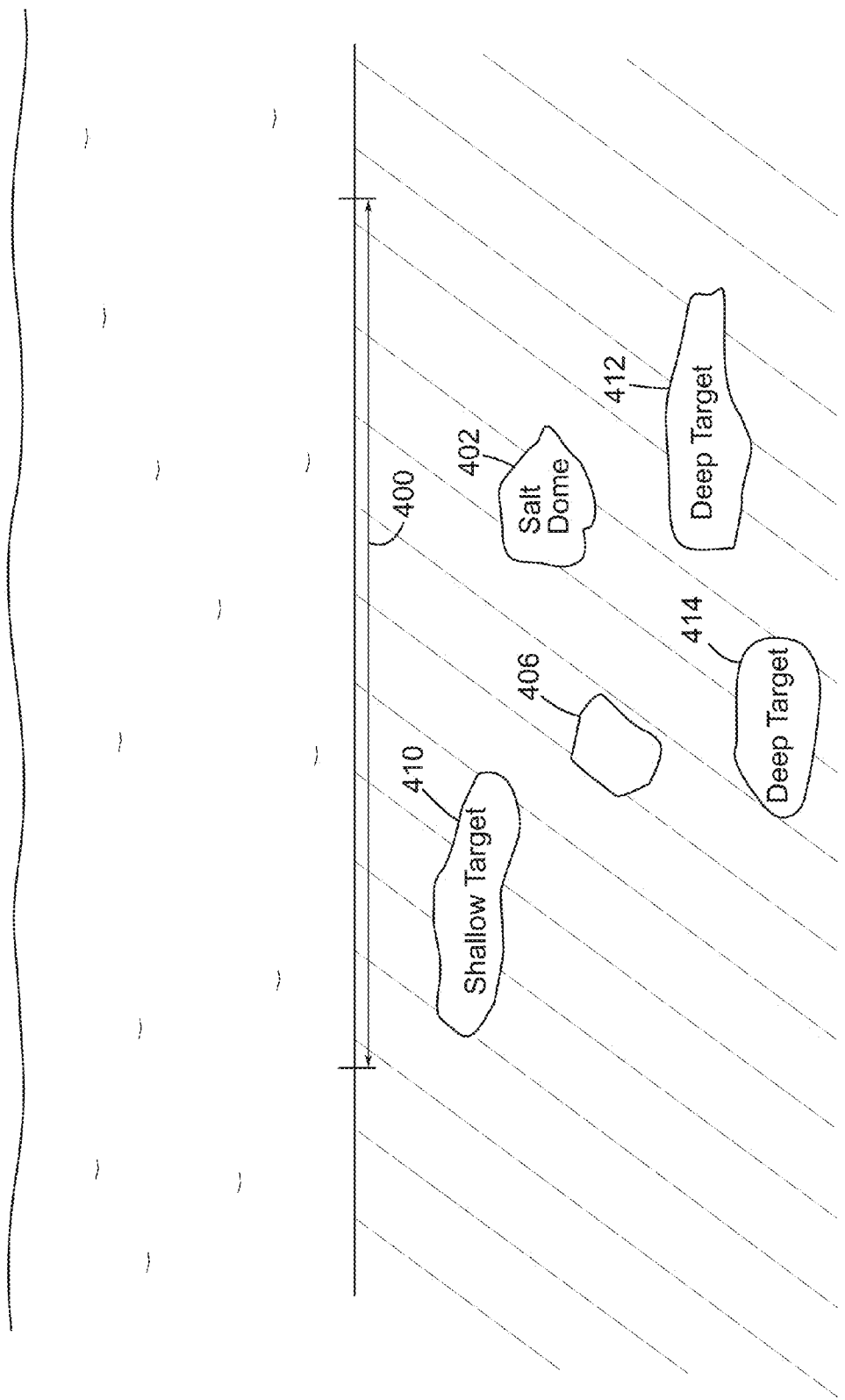
Figure 7:
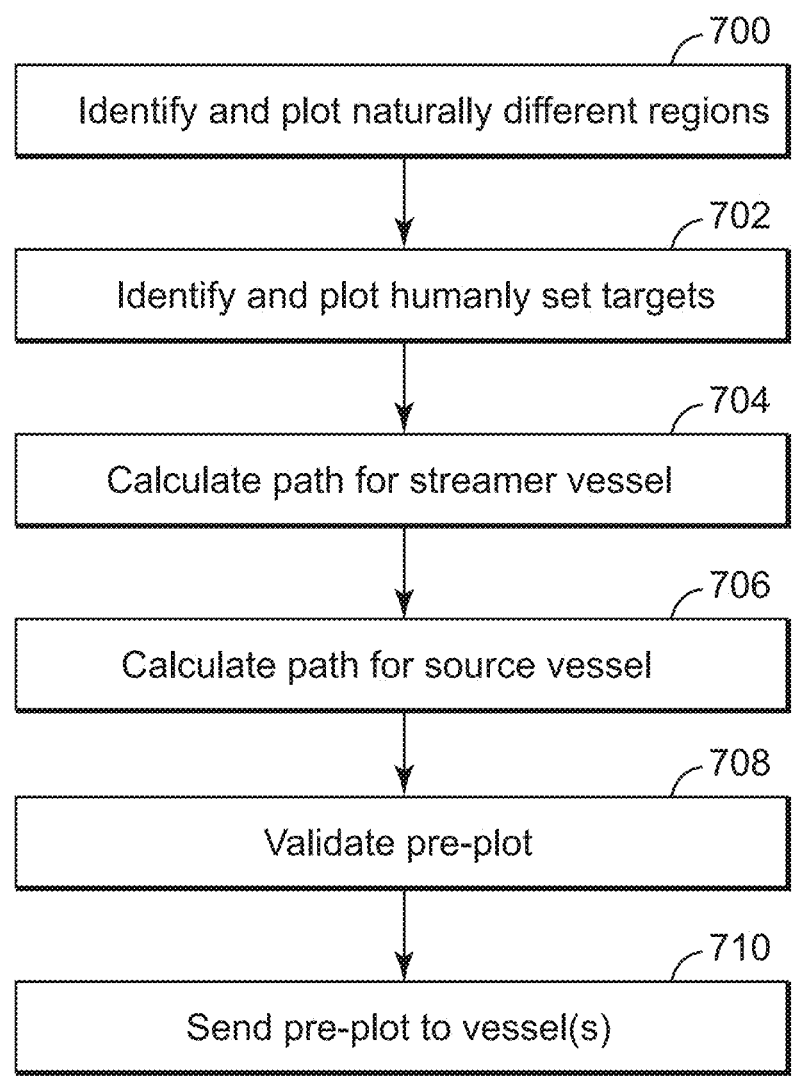
FIG. 7 is a flow chart of a method for designing a pre-plot for a seismic survey.

However, according to an embodiment, the illumination and/or resolution of a seismic survey is dynamically adjusted during the survey. This can be achieved by planning the seismic survey as now discussed. Suppose that a seismic survey needs to be performed for area 400. Based on prior knowledge (e.g., earth model that estimates the various layers present in the volume under area 400), the planner of the seismic survey identifies the naturally different regions. Note that this step may identify the naturally different regions with high or low precision. For the purpose of the invention, even a low precision in identifying these regions will work. These regions, which are generically identified with reference number 402, are plotted on a graph as illustrated in FIG. 5. Those skilled in the art would understand that the naturally different regions 402 may have other consistency than that of a dome salt. For example, FIG. 6 shows a set of possible naturally different regions 402. FIG. 5 shows only one naturally different region 402 for simplicity. Any number of such regions may be identified. This step of identifying the naturally different regions and illustrating them in a graph corresponds to step 700 of the method shown in FIG. 7. In one application, the naturally different regions are received by the planner from a library or from another source.

In step 702, the planner identifies and plots on the same FIG. 5 the humanly set targets 410, 412 and 414 (deep target). These targets are usually set by the oil and gas company that orders the survey. However, it is possible that the planner sets the targets or additional targets. In one application, a humanly set target may be a naturally different region. For example, a humanly set target may be the salt dome 402, which is also a naturally different region. In other words, the targets and the regions may coincide in certain situations. The order of steps 700 and 702 is irrelevant and can be reversed. In one application, it is possible that only one of the steps 700 and 702 is performed.

A bird view of the plot of FIG. 5 is illustrated in FIG. 8. The shape of area 400 may differ than the one shown in FIG. 8 or previous figures. The planner now uses a dedicated tool (software) that runs on dedicated hardware for determining the pre-plot, i.e., calculates in step 704 the path to be followed by a streamer vessel, if only one streamer vessel is considered. If more than two streamer vessels are considered, the dedicated tool will calculate a path for each of them. The path of the source vessel(s) is not calculated at this time. FIG. 8 shows the path 830 to be followed by a streamer vessel 832 to cover area of interest 400. Streamer vessel 832 by definition tows at least a set 834 of streamers. In one embodiment, streamer vessel 832 may also tow a seismic source 836. Both the streamers and the sources are well known in the field and thus, their description is omitted herein. Note that path 830 crosses many of the naturally different regions and the humanly set targets. In one embodiment, path 830 for the streamer vessel is calculated only based on the shape of area 400, and not taking into account the naturally different regions and/or the humanly set targets. This is so because the streamer vessel needs to cover the entire area 400, without leaving any gap.

However, in step 706, the naturally different regions and/or the humanly set targets are taken into consideration for calculating the source vessel's path 840. Again, this embodiment considers only one streamer vessel and one source vessel for simplicity. The method discussed herein works for any number of streamer vessels and/or source vessels. In step 706, for each naturally different region and/or the humanly set target, a best position of the source vessel relative to the streamer vessel is calculated. Source vessel is a vessel that tows one or more sources but no streamers. The method takes into account that for a deep target, more illumination is necessary, for a target below the dome salt an increase of the offset is necessary (i.e., more illumination), for a shallow target more near offset is necessary, i.e., the source needs to be almost on top of the streamers, for better description of diffraction and/or reflection curvatures a better resolution is required, etc. Those skilled in the art would understand that for each region and/or target that is present in the planning phase, as illustrated in FIG. 5, a different illumination and/or resolution may be required, which means that the source vessel's path dynamically changes relative to the streamer vessel to achieve the desired illumination and/or resolution. Those skilled in the art would understand that in one embodiment, it is possible to steer only the sources and not the vessels for achieving the same dynamic change.

After each naturally different region and/or the humanly set target is assigned an appropriate illumination and/or resolution, the actual path of the source vessel is calculated to achieve those desired illuminations and/or resolutions. In one embodiment, it is possible to generate a library of all known naturally different regions and/or the humanly set targets and associate corresponding illuminations and/or resolutions to each region and target. The term "resolution" describes a seismic wave-field with broader spatial and temporal bandwidth in various domains, which is necessary for imaging small scale features of the subsurface. A dense offset azimuth distribution increases the probability to describe the target at a fine scale. Alternatively, the term "resolution," as in optics, means the detail an image holds. In the seismic case, this translates in the amount of waves that are send from the source(s) to a given area to be surveyed. The term "illumination" is associated with generating reflections of the emitted seismic wave-field from a specific geological target. The complexity of the overburden could prevent the seismic wave-field to reach the objective with the necessary reflection angle. A large offset azimuth distribution increases the probability to illuminate the target. Alternatively, the term "illumination," also as in optics, means the angle diversity of the incoming seismic waves when viewed from the target's point of view.

Path 840 of the source vessel 842, which tows a source 844 (which can be a mono- or dual-source, vibratory or impulsive) is also shown in FIG. 8. Source path 840 is substantially parallel (within the error incurred due to the ocean currents) with the streamer path 830 when there are no naturally different regions and/or humanly set targets. However, when the paths cross salt dome 402, the two paths are getting closer as illustrated in zone A or further apart as illustrated in zone B. The two paths may coincide in zone C so that the source vessel is in top of the set of streamers, for improving the near offset data, and making it denser. Source path 840 may move further away from streamer path 830 in zone D, to better illuminate the deep target 412. Finally, in zone E, where a gas cloud region 406 is present in top of deep target 414, the source path is the furthest from the streamer path for penetrating the complex target below (this implies a wider source-receiver distribution to insure a proper illumination of the target).

FIG. 8 shows that by dynamically adjusting the source vessel's path 840, a dynamic illumination and/or resolution of the entire data acquisition system is achieved, which is appropriate for each of the naturally different regions and/or the humanly set targets. In step 708, the calculated pre-plot (that includes paths for each vessel participating in the survey) are validated, e.g., making sure that no gap is left in area 400, at no time two vessels are expected to be at the same location, etc. After validation, the calculated pre-plot is sent in step 710 to the vessel(s) that participate in the seismic survey to be executed. In one embodiment, the vessels download the pre-plot while in the harbor, or just before starting the seismic survey, at the area 400.

To correlate the effect of the source vessel's location relative to the streamer vessel's position, during a seismic survey, to the illumination and/or resolution to be achieved, a few specific configurations of this set up are now discussed. For the same considerations as above, i.e., simplicity, the following embodiments consider a marine seismic acquisition system having one streamer vessel and one source vessel. Both vessels have deployed marine sources (in mono or dual source configurations). The position of the source vessel relative to the streamer vessel could be characterized by a lateral distance (cross-line distance) between the two vessels ($d_y$) and an inline distance along the acquisition line ($d_x$). In one embodiment, for example, when applying these considerations to a source vessel and a set of AUVs (no streamer vessel), a geometrical center of the AUV formation is defined and the inline distance $d_x$ and the cross-line distance $d_y$ are measured between the position of the geometrical center (or another center of the AUV formation) and the position of the source vessel or source itself. In still another embodiment, the inline and cross-line distances are measured between the source towed by the streamer vessel and the source towed by the source vessel. Those skilled in the art would understand that various points can be associated with the sources and/or AUV (seismic receivers) configurations and the positions of these points may be controlled to achieve the desired illumination and/or resolution.

Returning to the system having a single streamer vessel and a single source vessel, the towed set of streamers (also called a spread) is characterized by its width (W), its length (L) and streamer separation ($d_w$). As the spread is towed back and forth along the area to be surveyed, adjacent sail lines may be designed to be so close that half of the spread along a current sail line overlaps with half of the spread when on a previous sail line for achieving extra illumination.

The examples that are discussed now are very specific, in the sense that the number of sources, the number of streamers, the length of the streamers L and the streamer separation $d_w$ are specified. These details should not be construed that the invention is limited only to such dimensions. These details are provided only to give the reader a better sense of how the invention works.

First, the effect of the inline position of the source vessel relative to the streamer vessel (or the effect of the source vessel relative to the geometrical center for the AUV formation, if the streamers are replaced by AUVs) is discussed with reference to FIGS. 9A-11C. FIG. 9A shows a first seismic acquisition system 900 that includes a streamer vessel 902 and a source vessel 904, each vessel towing a corresponding source 903 and 905, respectively. Source vessel 904 and corresponding source 905 are advancing along sail line 910, ahead of streamer vessel 902 and corresponding source 903. Streamer vessel 902 advances along sail line 910. Each source 903 and 905 include two mono-sources that can be fired in a flip-flop manner or simultaneously. The streamer spread 912 includes for this example six streamers, each 3 km long. A streamer separation distance $d_w$ is about 100 m. The adjacent sail lines are separated by a distance of about 0.6 km.

The azimuth distribution (i.e., seismic data achieved for a given azimuth and offset between the source and the sensor recording the seismic data) is plotted in FIG. 9B. The concentric circles indicate the offset between the source (located in the center of the circles) and a corresponding sensor (located at each gray region) and the azimuth distribution is indicated by the angle, along the circles, between a vertical line and a line that connects the source with a corresponding sensor. FIG. 9C illustrates the fold, i.e., the number of traces of seismic data (recorded by the sensors) versus the offset between the source and the sensors. Both FIGS. 9B and 9C show how the advanced inline position of the source vessel increases the azimuth offset and fold, from about 3 km to about 6 km. Note that without the source vessel, the maximum offset would be about 3 km, while the addition of the source vessel adds another 3 km of offset, as the source vessel is about 3 km ahead of the streamer vessel. In other words, the illumination added by the source of the source vessel increases the fold for mid- and far-offset and extends the illumination to longer inline offsets ($h_x$) than the length of the streamers ($h_x$>L). FIG. 9D schematically shows how the source vessel extends the illumination to longer inline offsets. The configuration illustrated in FIGS. 9A-9D is most appropriate when a better illumination is need, for example, when a salt dome region is present or when a deep target is necessary to be investigated.

In the embodiment illustrated in FIGS. 10A-10D, a similar configuration is presented but this time the source vessel and the streamer vessel (only the corresponding sources 1003 and 1005 are shown) have substantially the same inline position along the sail line 1010. For this configuration, FIG. 10B shows the azimuth distribution being increased while the offset being reduced, which results in an increased fold of the near and mid offsets as illustrated in FIG. 10C. Note that the fold for the 3 to 6 km offsets have decreased while the fold for the 0 to 3 km have increased. FIG. 10D illustrates how the presence of the source vessel next to the streamer vessel increases the fold.

FIGS. 11A-11D shows another seismic acquisition system 1100 in which the source vessel and associated source 1105 is next to the streamers. For this configuration, as illustrated in FIG. 11B, the azimuth distribution is improved along a horizontal line and for the near offsets. FIG. 11C shows that the fold and associated illumination is improved for near and mid-offsets. FIG. 11D shows how the presence of the source vessel almost on top of the streamers increases the near offsets. The configuration illustrated in FIGS. 11A-11D is most appropriate for a shallow target that requires more resolution. Also note that by increasing the fold for the near offsets as illustrated in FIG. 11C, a signal-to-noise ratio is improved, which means better resolution for the image of the subsurface.

The next embodiments explore the impact of having the source of the source vessel shooting in a flip-flop or simultaneous manner. In this context, when designing the pre-plot as discussed with regard to the method illustrated in FIG. 7, it is possible to select not only the position of the source vessel relative to the streamer vessel, but also the type of seismic acquisition, i.e., flip-flop of simultaneous. Thus, the method of FIG. 7 may be extended with an additional step in which the type of shooting the sources towed by the streamer and source vessels is selected/changed as the seismic survey progresses. In one embodiment, it is possible to maintain the relative positions of the sources fixed while changing only the shooting style along the sail lines.

For comparison reasons, FIGS. 12A-12C show a traditional seismic survey 1200 that has a single streamer vessel 1202 and no source vessel. Streamer vessel 1202 tows a mono-source 1203 and a streamer spread 1212. There are 12 streamers in the spread, each 6 km long and the streamer separation distance $d_w$ is about 100 m. Adjacent sail lines 1210 are separated by about 1.2 km. FIG. 12B illustrates the azimuth distribution for such configuration while FIG. 12C shows the fold.

Marine seismic system 1300 illustrated in FIGS. 13A-13C is similar to system 900 discussed above, except that the sail lines separation is now double. Sources 1303 and 1305 are shot in a flip-flop manner. FIG. 14A shows a system 1400 similar to system 1300 except that sources 1403 and 1405 are shot simultaneously (i.e., there is an overlap between the recording times for the two sources and the overlap can have any value but zero; simultaneous shooting does not exclude that the two sources are simultaneously fired, but this term also includes two sources that are fired with a time delay as long as there is the overlap between their recording times). FIGS. 13B and 14B show that the azimuth overall is almost as diverse as the one obtained in FIG. 12B for the traditional survey, although the streamer spread for systems 1300 and 1400 is half in length when compared to the streamer spread for system 1200. FIG. 13C shows a lower fold then FIG. 12C while FIG. 14C shows a fold as high as that illustrated in FIG. 12C. Thus, by using the simultaneous shooting as in FIG. 14A, it is possible to reduce the streamer spread's size without seriously affecting the azimuth distribution and/or the fold. This is an important consideration when the cost of a survey is factored in.

Next, the impact of the source vessel's cross-line position relative to the streamer vessel is discussed with regard to FIGS. 15A-17C. FIG. 15A shows a system 1500 having two sources 1503 and 1505, with the first source 1503 positioned in front of the streamer spread 1512 and the second source 1505 located on a side of the streamer spread. If the cross-line distance $d_y$ between the two sources is about W (the width of the spread), and the inline distance of source 1505 relative to source 1503 is about $-L/2$, the geometry of system 1500 is equivalent to a WAZ (wide azimuth) system and the extra illumination is generated by the second source 1505, as shown in FIG. 15B. FIG. 15C shows how the fold has increased for the near-offset.

FIG. 16A shows a system 1600 similar to that of FIG. 15A, but the second source 1605 is effectively in top of the streamer spread as the cross-line distance $d_y$ between the two sources is at maximum W/2 and $d_x$ is about $-L/2$. In other words, the second source 1605 is on the middle of the streamer spread. Extra illumination with full azimuths around the zero-offset is observed in FIG. 16B. The fold of near-mid offsets is increased as illustrated in FIG. 16C. The arrow in FIG. 16C indicates that the zero-offset fold is now filled, which was not the case previously.

FIG. 17A shows another system 1700 having only the second source 1705 on top of the middle of the streamer spread, as the cross-line distance between the second source and a hypothetical position of the first source (note this hypothetical position of the first source is given by a location of the streamer vessel 1702) is about equal to the streamer separation $d_w$ and the inline position is about $-L/2$. This configuration could be considered as a pure marine split-spread: any source actuation is acquired for both positive and negative source-receiver offsets. In this case, there is no long-offset contribution and a dense full azimuth near-offset illumination is achieved as illustrated in FIG. 17C.

From the various embodiments discussed above, one can note that the variations of the $d_x$ and $d_y$, i.e., dynamically adjusting the position of the second source relative to the first source (or dynamically adjusting the position of the source vessel relative to the streamer vessel or dynamically adjusting the position of the source vessel relative to a center of an AUV formation) allows the operator of the seismic survey to modify the offset azimuth and/or fold distribution of the initial NAZ (narrow azimuth) system. In other words, a NAZ system 900 becomes larger or longer or denser or split-spread (with zero-offsets and full azimuth of near offsets) as the location of the source vessel is dynamically adjusted relative to the streamer spread. Similar variations may be achieved by firing the sources according to different schemes. Thus, in one embodiment, the location of the source vessel and the firing type are dynamically adjusted while the seismic survey progresses along the sail line. This is nothing else than designing the pre-plot for the streamer and source vessels or for the AUV formation and the source vessels to dynamically adjust the illumination, resolution and/or firing based on expected naturally different regions and/or humanly set different targets along the sail line. In other words, the design (or determination or calculation) of the pre-plot is made such that for each naturally different region and/or humanly set different target an appropriate illumination and resolution are achieved by the seismic survey system.

To express the same idea in different words, during the pre-planning phase of acquisition, various seismic challenges (i.e., natural regions or humanly set targets) could be evaluated and the most suitable inline distance $d_x$ and cross-line distance $d_y$ (of the second source relative to the first source) could be estimated for these different areas. A smooth navigation path of the source vessel is optimized integrating various operational and seismic processing constrains. In one embodiment, during the acquisition phase, the streamer vessel will perform exactly the same navigation path as for a regular NAZ and only the source vessel navigates along the optimized travel paths. The shooting sequence of the two vessels could integrate or not simultaneous source approach as already discussed above. This decision could be made during the pre-planning, in relation to the requirement for bin size and/or fold.

A variable depth streamer configuration may be necessary for some embodiments for a successful receiver deghosting. For example, for the embodiment illustrated in FIG. 17A, the streamer spread needs to have this variable depth streamer profile so that the streamers are deep enough to not interfere with the source vessel, which is in top of the streamers. The configuration of the front end of the streamer spread could be repeated at its tail. This setup allows having the deeper sections at the middle of the spread, which creates safer conditions for the source vessel when crossing the spread.

Some benefits of a 3D acquisition with dynamic resolution affect both the acquisition and processing phases. For example, during the acquisition phase, an efficient acquisition for a multi-target survey may be achieved. During the processing phase, there are resolution and illumination challenges. For the resolution challenges, acquiring zero-offset data will help obtain better spatial resolution at shallow target, for better multiple removal, better description of diffraction and reflection curvatures allowing better velocity estimation and/or better signal-to-noise ratio due to the extra fold.

A smaller bin size could be acquired by interleaving both dual-sources towed by the streamer and source vessels. An accurate image of shallow target could be achieved by relying on acquired reflection primaries and not only on data generated by interpolation algorithms or derived from multiples. Moreover, a regularization algorithm may also benefit of a split-spread offset azimuth distribution and predict more reliable seismic traces.

For the illumination challenges, the multi-vessel dynamic acquisition is able to acquire extra-long inline offsets and/or extra-large cross-line offsets. These offsets are necessary to illuminate a complex target for better subsalt illumination, for avoiding gas cloud areas, for longer offset distribution necessary to AVO (Amplitude Versus Offset) characterization, for wider azimuthal distribution necessary to AVA (Amplitude Versus Azimuth) characterization.

Various embodiments discussed above can be applied to an AUV formation instead of a streamer spread. An example of such a system is illustrated in FIG. 18, in which a seismic acquisition system 1800 includes a source vessel 1802 that tows a source 1804 along a sailing line 1810. FIG. 18 is a bird view of the system, and thus, source vessel is floating in water 1812 while AUVs 1820 are either on the ocean bottom or floating at given depths relative to the water surface. As the source vessel is advancing along sail line 1810, some AUVs distributed along line L1 are instructed to change their positions and move along line L1' while the other AUVs distributed along lines L2 and L3 are stationary. In one embodiment, the lines are moving with the ocean currents. As the AUVs move around the survey area A, new regions 1840 and/or targets 1842 are coming onto focus. Thus, based on the embodiments discussed above, the sail line 1810 is dynamically adjusted to apply the expected illumination and/or resolution for collecting the seismic data.

The concepts of "illumination" and "resolution" have been discussed above. FIGS. 19A-C illustrate these concepts by showing a streamer vessel 1902 that tows a dual source 1903 and a source vessel 1904 that tows a dual source 1905. Streamer vessel 1902 also tows spread 1906. Area 1950 corresponds to the subsurface for which reflected or refracted seismic waves from the first source 1903 are recorded by the receivers located on the streamer spread 1906 while area 1960 corresponds to the subsurface for which reflected or refracted seismic waves from the second source 1905 are recorded. Note that while area 1950 is fixed relative to the streamer spread, area 1960 can be adjusted by modifying the inline and/or cross-line position of the second source relative to the streamer spread. This means that the configuration shown in FIG. 19A provides more resolution as the two areas overlap while the configuration shown in FIG. 19C provides more illumination as the second area extends the reach of the first area.

While the above embodiments discussed only marine acquisition seismic surveys, those skilled in the art would understand that the same principles may be applied to a land acquisition system or an ocean bottom acquisition system.

A method for calculating a pre-plot for a marine seismic acquisition system is now discussed with regard to FIG. 20. The method includes a step 2000 of receiving as input a first number of streamer vessels and a second number of source vessels, wherein each of the first and second numbers are between 1 and 20, a step 2002 of receiving a geometry of an area to be surveyed, a step 2004 of receiving a set of naturally different regions and/or humanly set targets for the area to be surveyed, a step 2006 of calculating a first sailing path for a streamer vessel of the first number of streamer vessels, a step 2008 of calculating a second sailing path for a source vessel of the second number of source vessels, based on the set of naturally different regions and/or humanly set targets, wherein the first sailing path and the second sailing path form the pre-plot, and a step 2010 of entering/downloading the pre-plot into a navigation system of the streamer vessel and the source vessel so that the streamer and source vessels dynamically change an offset distance between them, while sailing during a seismic survey, based on the naturally different regions and/or humanly set targets. In one application, the method may include a step of receiving a geometry of autonomous underwater vehicles (AUVs) located over the area to be surveyed, and a step of calculating the second sailing path for the source vessel based on the geometry of the AUVs and the set of naturally different regions and/or humanly set targets The offset distance changes to achieve a better illumination or a better resolution. In one embodiment, the source vessel is programmed to sail farther from the streamer vessel to achieve a better illumination or the source vessel is programmed to sail closer to the streamer vessel for achieving a better resolution.

In one application, the streamer and source vessels each tows at least one source and the two sources are fired simultaneously. In another application, the streamer and source vessels each tows at least one source and the two sources are fired in a flip-flop manner. The naturally different regions include a gas volume or a salt dome and the humanly set targets includes a deep target and a shallow target.

The above noted method may be implemented in the marine acquisition system 800 discussed above, which includes a streamer vessel 832 that tows a streamer spread 834 and a first source 836, and a source vessel 842 that tows a second source 844. Coordinates of a streamer sail line 830 may be stored at the streamer vessel (for example, in a memory of a navigation system) and coordinates of a source sail line 840 may be stored at the source vessel (for example, in a memory of a navigation system). The coordinates of the source sail line are calculated based on a set of naturally different regions and/or humanly set targets that characterizes a region to be surveyed.

In one application, the streamer and source vessels dynamically change an offset distance between them, while sailing during a seismic survey, based on the naturally different regions and/or humanly set targets. The offset distance changes to achieve a better illumination or a better resolution or both.

In still another application, the streamer sail line is straight from one edge to another edge of the region to be surveyed while the source sail line changes direction as a new region or target of the naturally different regions and/or humanly set targets is encountered.

Figure 21:
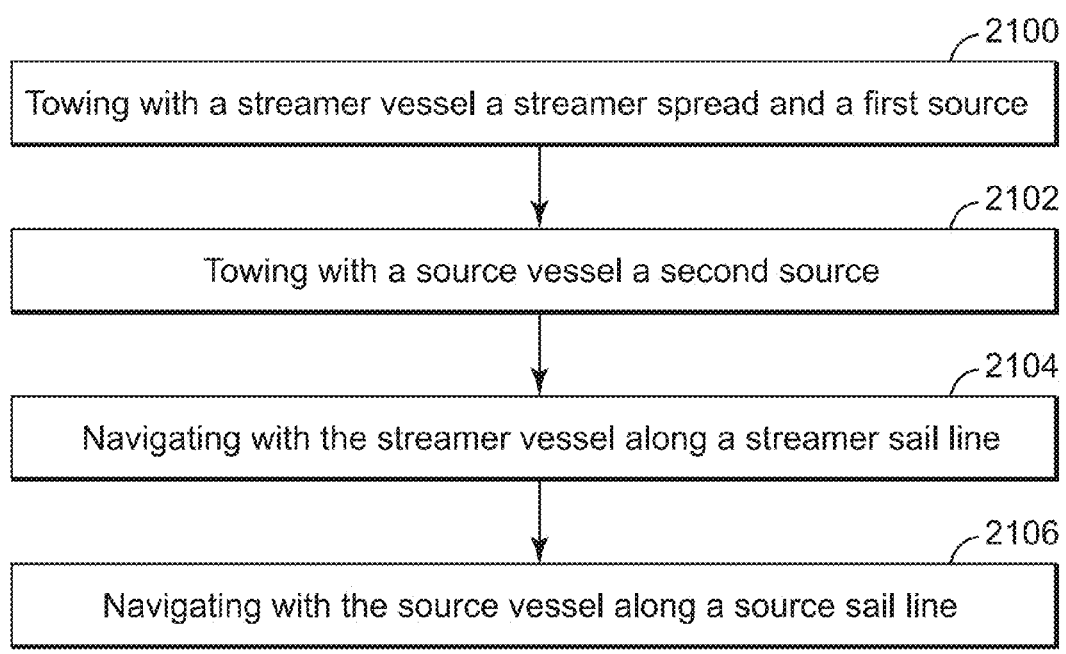
FIG. 21 is a flowchart of a method for collecting seismic data based on the pre-plot calculated in FIG. 20

In still another embodiment, illustrated in FIG. 21, a method for acquiring seismic data with varying illumination and/or resolution is discussed. The method includes a step 2100 of towing with a streamer vessel 832 a streamer spread 834 and a first source 836, a step 2102 of towing with a source vessel 842 a second source 844, a step 2104 of navigating with the streamer vessel along a streamer sail line 830, and a step 2106 of navigating with the source vessel along a source sail line 840, wherein the source sail line is calculated based on a set of naturally different regions and/or humanly set targets that characterizes a region to be surveyed.

The streamer and source vessels dynamically change an offset distance between them, while sailing during a seismic survey, based on the naturally different regions and/or humanly set targets. For the configurations discussed above, it may be advantageous to steer source array emissions (i.e., the source array of one, two or all the vessels that are used in the seismic survey) so that the acoustic wave front they generate impinges on the naturally different regions and/or humanly set targets (e.g., salt dome's flanks) at an angle closer to normal incidence. One way to change the source array's directivity pattern is to operate multiple source elements at the same phase, but have them operate at different depths. This creates a tilted acoustic wave front; its main lobe attains a maximum at an angle away from vertical. Deploying source elements at multiple depths may create towing problems and, because the source elements are at different depths, different hydrostatic pressures will act on them that create unwanted complexity. As an alternative, source elements operating at approximately the same depth can be phased differently. The result is that the source array's directivity pattern can be tilted to approximate the same pattern as sources operating synchronously at different depths. Phasing can be just a time delay, but because of the surface ghost contribution, in practice, the phasing scheme may be more complicated.

Another factor that can change source array directivity patterns is source element amplitude. While it is ordinarily desirable to operate all source elements at their maximum output, it is anticipated that in some situations it might be desirable to have the output of at least one source element different than the others. The difference in amplitude could be invariant with frequency or change with frequency. For example, a special case might be to use variable amplitudes to tune out the direct arrival (horizontally propagating) energy from the source array that impinges on the near offset streamer hydrophones (see, for example, Sallas, U.S. Pat. No. 4,918,668, the entire content of which is incorporated herein by reference).

The beam-steering process can also be used to create ghost notch diversity. For example, in marine acquisition, spectral notches in down-going acoustic energy can occur in the amplitude spectrum of conventional constant depth source arrays due to the effect of destructive interference with the surface reflection. Dual-depth or variable-depth source streamers provide means to counter this effect. One option is a towed curved array. Because the sources are located at different depths, reflections will constructively and destructively interfere, causing spectral notches to be filled in when compared to constant depth arrays. Examples for steering a source array beam is discussed, for example, in U.S. patent application Ser. No. 14/168,207, entitled Vibrator Source Array Beam-Forming and Method, the entire content of which is incorporated herein by reference.

The above-disclosed embodiments provide a system and a method for recording seismic data with dynamically changing azimuth and/or offset distribution during a seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calculating a pre-plot for a marine seismic acquisition system, the method comprising:
   receiving as input a first number of streamer vessels and a second number of source vessels;
   receiving a geometry of an area to be surveyed;
   receiving a set of naturally different regions and/or humanly set targets for the area to be surveyed;
   calculating a first sailing path for a streamer vessel of the first number of streamer vessels, wherein the calculating is based on the geometry of the area to be surveyed, but is not based on the set of naturally different regions and/or humanly set targets that are present in the area to be surveyed;
   calculating a second sailing path for a source vessel of the second number of source vessels, based on the set of naturally different regions and/or humanly set targets, wherein the first sailing path and the second sailing path form the pre-plot; and
   entering the pre-plot into a navigation system of the streamer vessel and the source vessel so that the streamer and source vessels advance along substantially parallel paths over the area to be surveyed, when no naturally different regions and/or humanly set targets are present, and the source vessel dynamically changes an offset distance relative to the streamer vessel, while sailing during a seismic survey, based on the naturally different regions and/or humanly set targets.

2. The method of claim 1, wherein the offset distance changes to achieve a better illumination and/or a better resolution.

3. The method of claim 1, further comprising:
   receiving a geometry of autonomous underwater vehicles (AUVs) located over the area to be surveyed; and
   calculating the second sailing path for the source vessel based on the geometry of the AUVs and the set of naturally different regions and/or humanly set targets.

4. The method of claim 1, wherein the source vessel is programmed to sail farther from the streamer vessel to achieve a better illumination.

5. The method of claim 1, wherein the source vessel is programmed to sail closer to the streamer vessel for achieving a better resolution.

6. The method of claim 1, wherein the streamer and source vessels each tows at least one source and the two sources are fired simultaneously.

7. The method of claim 1, wherein the streamer and source vessels each tows at least one source and the two sources are fired in a flip-flop manner.

8. The method of claim 1, wherein naturally different regions include a gas volume or a salt dome.

9. The method of claim 1, wherein the humanly set targets includes a deep target and a shallow target.

10. A marine acquisition system comprising:
a streamer vessel that tows a streamer spread and a first source;
a source vessel that tows a second source;
coordinates of a streamer sail line stored at the streamer vessel, wherein the coordinates of the streamer sail line are calculated based on a geometry of an area to be surveyed, but not based on a set of naturally different regions and/or humanly set targets that are present in the area to be surveyed; and
coordinates of a source sail line stored at the source vessel,
wherein the coordinates of the source sail line are calculated based on the set of naturally different regions and/or humanly set targets that characterize the region to be surveyed, and
wherein the streamer and source vessels advance along substantially parallel paths in the area to be surveyed when no naturally different regions and/or humanly set targets are present along the streamer sail line, and the source vessel dynamically changes an offset distance relative to the streamer vessel when the naturally different regions and/or humanly set targets are present along the streamer sail line.

11. The system of claim 10, wherein the streamer and source vessels dynamically change an offset distance between them to achieve a better illumination and/or a better resolution.

12. The system of claim 11, wherein the offset distance changes to achieve a better illumination and/or a better resolution.

13. The system of claim 11, wherein the coordinates of the source sail line are calculated based on a geometry of autonomous underwater vehicles distributed an area of interest and the set of naturally different regions and/or humanly set targets.

14. The system of claim 11, wherein the first and second sources are fired simultaneously.

15. The system of claim 11, wherein naturally different regions include a gas volume or a salt dome.

16. The system of claim 11, wherein the humanly set targets includes a deep target and a shallow target.

17. The system of claim 11, wherein the streamer sail line is straight from one edge to another edge of the region to be surveyed while the source sail line changes direction as a new region or target of the naturally different regions and/or humanly set targets is encountered.

18. A method for acquiring seismic data with varying illumination and/or resolution, the method comprising:
towing with a streamer vessel a streamer spread and a first source;
towing with a source vessel a second source;
navigating with the streamer vessel along a streamer sail line; and
navigating with the source vessel along a source sail line,
wherein the source sail line is calculated based on a set of naturally different regions and/or humanly set targets that characterize a region to be surveyed and the streamer sail line is calculated based on a geometry of an area of the region to be surveyed, but not based on the set of naturally different regions and/or humanly set targets, and
wherein the streamer and source vessels advance along substantially parallel paths when no naturally different regions and/or humanly set targets are present along the streamer sail line, and the source vessel dynamically changes an offset distance relative to the streamer vessel when the naturally different regions and/or humanly set targets are present along the streamer sail line.

19. The method of claim 18, wherein the streamer and source vessels dynamically change an offset distance between them to achieve a better illumination and/or a better resolution.

20. The method of claim 18, wherein the offset distance changes to achieve a better illumination and/or resolution.

* * * * *